United States Patent [19]

Bruns

[11] 4,337,056
[45] Jun. 29, 1982

[54] MECHANICAL POWER TRANSMISSION SYSTEM

[75] Inventor: James A. Bruns, Itasca Pengilly, Minn.

[73] Assignee: Uniroyal, Inc., New York, N.Y.

[21] Appl. No.: 207,535

[22] Filed: Nov. 17, 1980

Related U.S. Application Data

[63] Continuation of Ser. No. 967,768, Dec. 8, 1978, Pat. No. 4,233,852.

[30] Foreign Application Priority Data

Dec. 12, 1977 [GB] United Kingdom ............... 51992/77

[51] Int. Cl.³ ............................................. F16G 1/28
[52] U.S. Cl. ..................................... 474/153; 474/205
[58] Field of Search ................................ 474/153, 205

[56] References Cited

U.S. PATENT DOCUMENTS

| | | | |
|---|---|---|---|
| 2,507,852 | 5/1950 | Case ...................................... | 474/153 |
| 3,078,206 | 2/1963 | Skura ................................. | 474/205 X |
| 3,756,091 | 9/1973 | Miller ................................... | 474/153 |
| 4,037,485 | 7/1977 | Hoback ........................... | 474/153 X |
| 4,108,011 | 8/1978 | Gregg et al. ....................... | 474/153 |
| 4,148,225 | 4/1979 | Redmond, Jr. et al. ............ | 474/153 |

Primary Examiner—C. J. Husar
Assistant Examiner—Conrad Berman
Attorney, Agent, or Firm—Philip Rodman

[57] ABSTRACT

A pulley configuration which increases the contact area between the pulley tooth tips and the land area of the belt teeth. The increased contact area reduces land area wear between belt teeth. The pulley tooth tip has a longitudinal cross-sectional contour partially composed of two substantially circular arcs connected by a line segment which is substantially straight or slightly curved. The length of the line segment is from 2 percent to 100 percent of the width of the belt tooth on which the pulley is used, and preferably less than about 7 percent of the width of the belt tooth. The pulley groove depth may be less than the height of the belt tooth and the groove has a longitudinal cross-sectional contour partially composed of two substantially circular arcs connected by a line segment which is substantially straight or slightly curved. The pulley in combination with a toothed belt forms a positive power transmission system.

1 Claim, 4 Drawing Figures

MECHANICAL POWER TRANSMISSION SYSTEM

This is a continuation of application Ser. No. 967,768, filed Dec. 8, 1978, now U.S. Pat. No. 4,233,852 issued Nov. 18, 1980.

BACKGROUND OF THE INVENTION

This invention relates to power transmission systems utilizing toothed power transmission belts cooperating with toothed pulleys, and also related to pulleys for use in such a system.

Power transmission systems are known utilizing belts having a plurality of alternating teeth and grooves extending generally transversely of the belt and meshing with alternating teeth and grooves in a grooved pulley in order to perform a driving function. Many proposals for such belts and pulleys have been made, and in particular considerable work has been done on designing the optimum shapes for the cross-sections for the teeth and grooves on both the belt and the pulley. For example, U.S. Pat. No. 3,756,091 to Miller discloses a positive drive system in which the belt includes relatively closely spaced together driving teeth of a special curvilinear cross-sectional configuration which is operated in conjunction with mating pulley grooves defined between pulley teeth having curvilinear cross-sections which are substantially conjugate to the teeth of the belt. Given a toothed belt in combination with a pulley, the conjugate form of the belt tooth is that tooth form described on the pulley which corresponds to the volume between the belt and the pulley which is not swept out by the belt tooth as the belt moves into contact with the pulley. For any given belt tooth, the conjugate form of pulley tooth can readily be determined graphically. Use of conjugate teeth on the pulley, desirably with small deviations from a true conjugate by the removal of additional material in the tip area of the tooth, is desirable as it ensures that the belt and pulley teeth are able to engage and disengage without interference.

For the purposes of this specification a groove formed between adjacent conjugate teeth will hereinafter be referred to as a conjugate groove. As used herein the terms describing the features of the present invention are defined in the patent to Miller.

U.S. Pat. No. 2,507,852, to R. Y. Case, describes a power transmission belt comprising an inextensible tensile member having teeth bonded to one side and a protective jacket fabric covering the teeth. The teeth are preferably made of an elastomeric material, such as rubber, and the belt may also include a backing layer of identical or similar material to that which the teeth are constructed.

Many different elastomeric materials have been utilized for the construction of belts made in accordance with the Case patent, some of the more common materials being neoprene and polyurethane. These belts are designed to mesh with toothed pulleys that are constructed of a material having a higher Young's modulus than the elastomeric material used for the construction of the belt. The conventional toothed belt, as described in the Case patent, utilizes a tooth cross-sectional configuration that is essentially trapezoidal and which is very similar to a conventional rack tooth. Many attempts have been made to alter the belt and pulley teeth configurations to relieve the problem of belt failure. In such trapezoidal tooth belts, the common failure is that of tooth shear due to stress concentration. In seeking to reduce tooth shear, U.S. Pat. No. 3,756,091 to H. Miller, discloses belt teeth having a cross-sectional configuration which approximates the contour of the one-half order isochromatic fringe in a belt tooth under a defined rated load. The pulley grooves in accordance with the Miller patent are in mating engagement with and are substantially conjugate to the belt teeth. The belt having substantially curvilinear teeth in accordance with the Miller patent reduced belt tooth shear and increased horsepower capacity. One mode of failure in the belt configuration according to Miller may occur because of land wear in the belt, especially with small diameter pulleys. Land wear between the belt teeth is due to abrasion of the proective layer and exposure of the tensile member by action of the pulley tooth against the belt. This land wear leads to premature failure due to a detachment of the teeth from the tensile member and/or a break in the tensile member.

U.S. Pat. No. 4,037,485, to Hoback, proposes a solution to the land wear problem. As disclosed in the Hoback patent, the dimensional relationship of the belt teeth and grooves and the pulley teeth and grooves is such that in the longitudinal extent of the belt between the pulleys, the height of the belt teeth is greater than the depth of the pulley grooves while as the belt travels around the pulleys, the extreme outwardly facing portions of the belt teeth which confront the pulleys comes into contact with the portions of the toothed pulley which define the bottom of the pulley grooves. At the same time, Hoback discloses that the belt teeth are compressed to reduce their height so that the extreme radially outwardly facing portions of the pulley teeth come into contact with the portions of the belt disposed between the belt teeth which define the bottoms of the belt grooves.

Relatively early in the operating life of the toothed power transmission belt and pulley as disclosed in Hoback, the compressive engagement of the elastomeric teeth against the bottom of the pulley groove results in a substantially permanent deformation of the belt tooth. This deformation is accelerated at elevated operating temperatures such as occur in automotive applications. The deformation results in a significant permanent decrease in the tooth height. The deformed teeth no longer support the tensile member as desired by Hoback. Subsequently, the same wear pattern develops in the toothed belt and pulley drive, according to Hoback, as in the toothed power transmission configuration according to the Miller patent.

Belt and pulley combinations as disclosed in the Miller U.S. patent are now in general use and have been found to give excellent results where the toothed pulley has, for example, 30 grooves or more and where such grooves are on an 8 mm pitch. In practice, this limitation imposes a minimum pulley diameter for any given tooth pitch and size combination, below which diameter belt life could be adversely affected depending on operating loads and conditions.

SUMMARY OF THE INVENTION

In some drive applications it would be advantageous to be able to use pulleys of less than the previous minimum diameter as in this way higher angular velocities may be achieved for the pulleys, and power transmission systems that are more compact and of lower weight can be designed because of the use of smaller pulleys. The object of the invention is to provide a power transmission system that is practical with small diameter toothed pulleys, for example, 8 mm pitch pulley having less than 30 grooves, while still being useful for larger pulleys with 30 grooves or more.

According to a first aspect of the present invention, a positive drive system comprises a flexible drive belt having a series of spaced teeth which are substantially curvilinear in longitudinal cross-section and at least one pulley having a plurality of teeth separated by grooves, in which each groove has a longitudinal cross-sectional contour that is substantially U-shaped and the form of each pulley tooth and groove deviates substantially from the respective conjugate forms derived from the belt tooth in one or more of the following respects:

a. the spacing between the facing flanks of adjacent pulley teeth is such that the groove formed between those teeth is substantially wider than the width of the conjugate groove;

b. the shape of the flank of each pulley tooth differs from the shape of the flank of the conjugate tooth;

c. the depth of the groove between adjacent pulley teeth is less than the height of a tooth of the belt;

d. the shape of the tip of each pulley tooth is modified so that there is greater clearance between that tip and the root of the belt tooth than there is with the conjugate tooth.

From another aspect of the invention, a pulley for use in conjunction with a flexible drive belt having a series of spaced teeth, which are substantially curvilinear in longitudinal cross-section, comprises a plurality of teeth separated by grooves, each pulley groove having a longitudinal cross-sectional curvature that is substantially U-shaped and is formed by two non-intersecting curved lines connected at the base of the groove by a line segment which is straight or slightly curved, each non-intersecting curved line being connected to the tip of a respective tooth by a line segment.

The curved lines will usually be, or will approximate to, arcs of circles. If the line segment at the base of the groove is curved, then the curvature is preferably less than the curvature of the non-intersecting curved lines. Preferably, the line segment at the base of the groove is shorter than either of the non-intersecting curved lines, and desirably, the length of that line segment is no more than 50% and preferably no more than 30% of the length of either curved line. Each of the non-intersecting curved lines preferably extends to a height on the tooth flank that is at least 25% of the depth of the groove and desirably at least 45% of the depth of the groove.

Preferably, the outermost portion of each pulley tooth tip is formed by two further non-intersecting curved lines connected by a line segment which is straight or slightly curved, each groove non-intersecting curved line being connected to the respective adjacent tip non-intersecting curved line by a connecting line segment which is straight or slightly curved. The further curved lines may again be, or approximate to, arcs of circles, although their deviation from such true arcs may be greater than that deviation shown by the curved lines forming the groove. The connecting line segments are each preferably substantially shorter than either of the non-intersecting curved lines of the pulley groove, and desirably the length of each connecting line segment is no more than 60% and preferably no more than 35% of the length of either of those curved lines.

Any of the line segments at the base of the groove, at the tip of the tooth or joining the non-intersecting curved lines of the groove and the tooth may, if not straight lines, be either concave or convex with respect to the body of the pulley.

Preferably, the connecting line segment joining the non-intersecting curved lines of a groove and adjacent tip, or a tangent to the center of said line segment if it is curved, forms an angle of 20° or less with the radial center-line of the respective groove.

The invention also extends to a positive drive system comprising at least one pulley as aforesaid in combination with a flexible drive belt having a series of spaced teeth, which are substantially curvilinear in longitudinal cross-section.

In such combination, preferably the form of each pulley tooth and groove deviates substantially from the respective conjugate forms derived from the belt tooth. Such deviation may be in two or more of four areas; the areas being the pulley tooth tips, the shape of the pulley tooth flanks, the width of the groove between adjacent pulley teeth and the depth of the groove between adjacent pulley teeth. Preferably, there is deviation in at least three areas, those areas being the pulley tooth tips, the shape of the non-intersecting curved lines defining the pulley flanks and the width of the groove between adjacent pulley teeth. Desirably also the pulley teeth are non-conjugate to the belt teeth so that there is greater clearance between the pulley and belt in the region of the root of the belt tooth and the tip of the pulley tooth as there are compared to a conjugate pulley tooth.

Preferably, the arcs to which the two non-intersecting curved lines forming the pulley groove approximate have radii smaller than the corresponding arcs that would form the conjugate groove, to allow the belt teeth to engage and disengage the pulley grooves without interference. The pulley groove width formed by these non-intersecting curved lines is desirably substantially greater than it would be with conjugate grooves.

The pulley groove may be of the same depth as the height of the belt tooth within commercial tolerances for both these measurements, or the pulley groove depth may be between 1% and 15% less than the belt tooth height, so that a rotating action may be performed between the tip of the belt tooth and the bottom of the pulley groove.

It is desirable that the ratio of belt tooth shear area to pulley land area is between 50:1 and 1:1 and desirably less than 15:1, and that the ratio of belt tooth shear area to belt land area of any belt used with the pulley is between 4.69:1 and 1:2, and desirably less than 3.5:1.

From yet a further aspect of the invention, a pulley for use in conjunction with a flexible drive belt having a series of spaced teeth, which are substantially curvilinear in longitudinal cross-section, comprises a plurality of teeth separated by grooves, each pulley groove having a longitudinal cross-sectional contour that is substantially U-shaped and is at least partially composed of two curved lines which are, or approximate to, arcs of circles, the arcs having centers of curvature which are displaced one from another. The displaced centers of curvature preferably lie at substantially equal radial distances from the axis of the pulley. With respect to the radial center-line of the groove, each center may lie on the same side of that line as the arc drawn from that center, or the center and the arc drawn from it may lie on opposite sides of the center-line. Preferably, the centers of these arcs or approximate arcs each lie within the area of the groove at a height that is at least 50% of the depth of the groove, and desirably at least 65% of the depth of the groove. Each of the arcs or approximate arcs preferably extends to a height on the tooth flank that is at least 25% of the depth of the groove and desirably at least 40% of the depth of the groove.

BRIEF DESCRIPTION OF THE DRAWINGS

The invention will be better understood from the following specific description given in conjunction with the accompanying drawings in which.

DETAILED DESCRIPTION OF THE INVENTION

Figure 1:
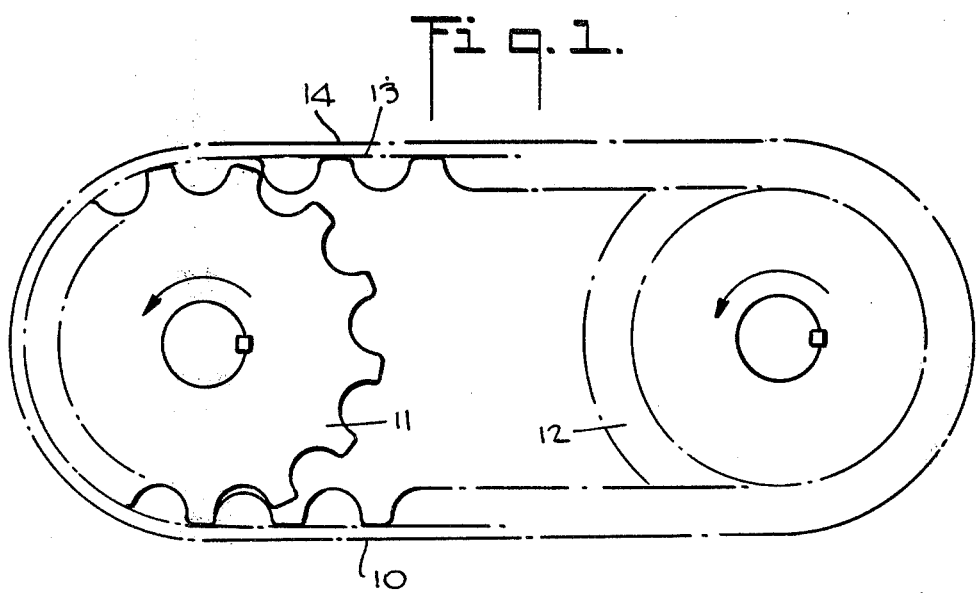
FIG. 1 is a longitudinal cross-sectional view looking transversely of the positive drive of this invention showing a belt in engagement with two cooperating pulleys.

As seen in FIG. 1, an endless belt 10 engages driving and driven pulleys 11 and 12. The belt 10 is provided with tensile member 13 comprising a plurality of turns of a continuous strand of filamentary material. The tensile member 13 carries substantially the entire working load imposed upon the belt 10 and, up to the maximum load for which the belt is designed, the tensile member 13 is substantially inextensible. U.S. Pat. No. 2,507,852 to Case and U.S. Pat. No. 3,756,091 to Miller may be consulted for a more detailed description of this general class of toothed belt and pulley system and construction thereof. The entire contents of the Case and Miller patents are hereby incorporated by reference. The belt further includes a backing layer 14 and a protective jacket (not shown) extending over the entire toothed surface of the belt. A thin layer of elastomeric or other material (not shown) between the jacket and the tensile member 13 may be added to improve adhesion in the land areas of the belt. The belt may be made in any one of a number of ways, but it is preferable to use the method described in U.S. Pat. No. 3,078,206 to Skura, the entire contents of which are incorporated hereby by reference. An alternative method for manufacture of the belt is described in the Case U.S. Pat. No. 2,507,852.

Figure 2:
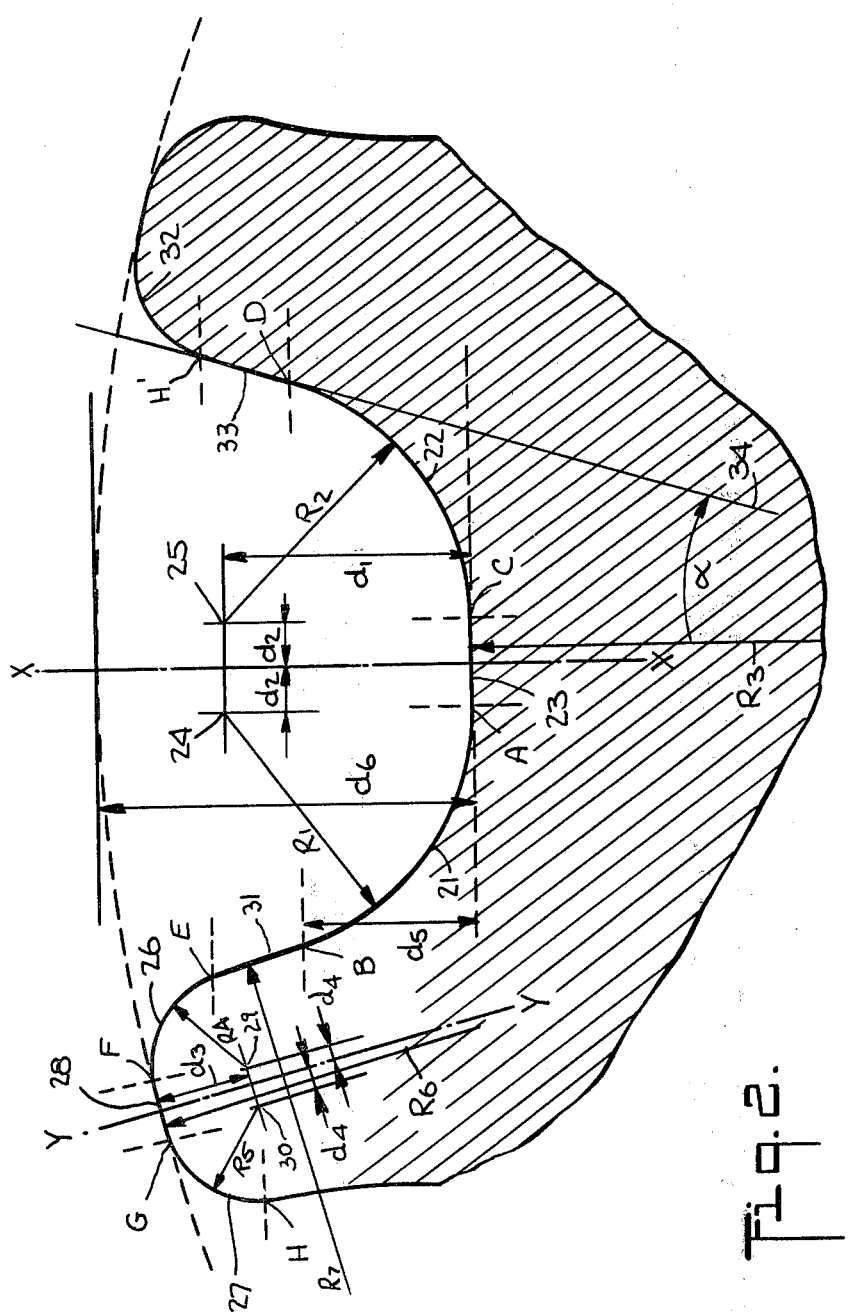
FIG. 2 is an enlarged fragmentary longitudinal cross-sectional view of a pulley.

FIG. 2 shows a typical profile of pulley tooth and groove according to the invention. The profile of the tooth and groove is made up as follows. Each groove is of substantially U-shaped longitudinal cross-section and is formed by two non-intersecting curved lines 21 and 22, each approximating to an arc of a circle, connected at the base of the groove by a line segment 23. The arc 21 is drawn from a center 24, is of radius R1 and extends from point A to point B. The arc 22 is drawn from center 25, is of radius R2 and extends from point C to point D. The centers 24 and 25 are displaced from each other and lie to opposite sides of the radial center line X—X of the pulley groove. The center 24 and the arc 21 drawn from that center lie to the same side of the center-line X—X, and similarly, the center 25 and arc 22 drawn from that center lie to the same side of the center-line X—X. The radii R1 and R2 are equal, and the centers 24 and 25 lie at equal radial distances from the center of the pulley and similarly at equal heights d1 from the base of the groove. The centers 24 and 25 furthermore lie at equal distances d2 to the opposite sides of the center-line X—X.

The line segment 23 forming the base of the groove and joining points A and C is constituted by an arc of a circle having radius R3 and drawn from a center (not shown) lying on the extension of the center-line X—X of the groove.

Each pulley tooth tip is formed by two further non-intersecting curved lines 26 and 27 each approximating to an arc of a circle, connected by a line segment 28. The arc 26 is drawn from center 29, has a radius R4 and extends from point E to point F. The arc 27 is drawn from center 30, has radius R5 and joins points G and H. The centers 29 and 30 are displaced one from another, lie at equal distances d3 from a tangent to the outside diameter of the pulley at the center-line Y—Y of the tooth, lie at equal distances d4 to opposite sides of the center-line and lie at equal radial distances from the center of the pulley. The radii R4 and R5 are equal. The line segment 28 is part of an arc of a circle having radius R6 drawn from a center lying on the extension of the center-line Y—Y.

The arc 21 defining part of the groove and the arc 26 defining part of the pulley tip are joined on the pulley flank by a connecting line segment 31 joining points B and E, the segment 31 being an arc of a circle having radius R7. Similarly, the arc 22 of the groove is joined to the adjacent arc 32 of the respective tooth tip by arcuate line segment 33 extending between points D and H'. The profile from point H to point H' is repeated around the circumference of the pulley to define the other teeth and grooves.

In designing the pulley groove and tooth form, it is desirable that the length AC of the line segment 23 at the base of the groove be no more than 50% and preferably less than 30% of the length AB or CD of either arc 21 or 22. The lengths BE and DH' of each connecting line segment 31 and 33 should desirably both be no more than 60% and preferably no more than 35% of the length AB or CD. Each arc 21 and 22 should preferably extend to a height $d_5$ on the tooth flank that is at least 25% and desirably at least 45% of the depth $d_6$ of the groove. The centers 24 and 25 from which the arcs 21 and 22 are drawn preferably lie at a height $d_1$, that is at least 50% and desirably at least 65% of the depth $d_6$ of the groove.

The groove and tooth form can vary somewhat from that shown. In particular, the center 24 and arc 21 drawn from that center can lie to opposite sides of the line X—X, and similarly, center 25 and arc 22 can lie to opposite sides of the line X—X. The arcs 21 and 22 may intersect, so eliminating the joining line segment 23. The center 29 and arc 26 drawn from that center can lie to opposite sides of the line Y—Y, and similarly center 30 and arc 27 can lie to opposite sides of the line Y—Y.

The line segments 23, 31, 33 and 28 are all shown as being concave with respect to the body of the pulley, but any or all of these segments may be straight lines or may be convex with respect to the body of the pulley. It is desirable that a line 34 that is an extension of line segment 33 if this is straight, or tangent to the center of line segment 33 if this is curved, make an angle $\alpha$ to the center line X—X of the groove that is 20° or less.

Figure 3:
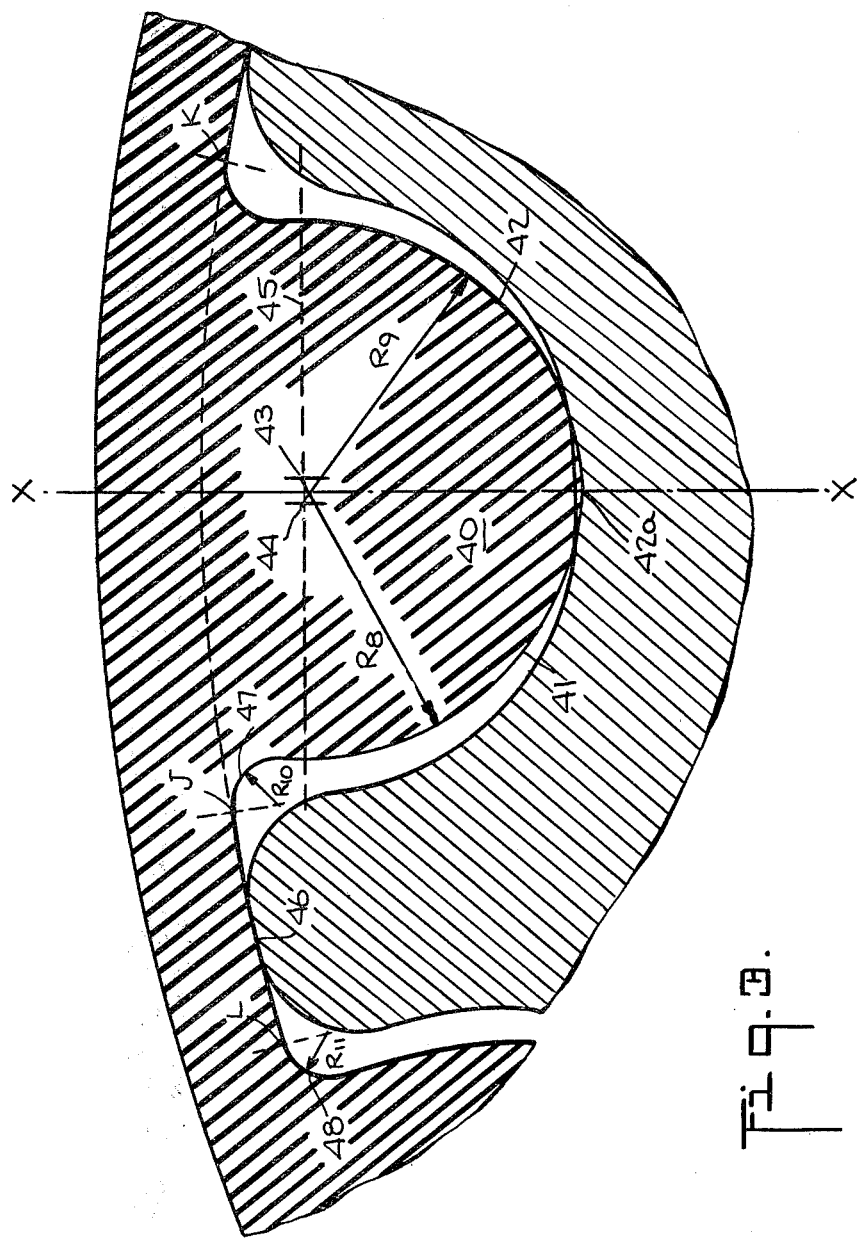
FIG. 3 is an enlarged fragmentary longitudinal side view of a mating pulley and belt with the belt wrapped around the pulley under a no load condition.

FIG. 3 shows part of a belt wrapped around a pulley having the tooth and groove form shown in FIG. 2, the belt being under no load. In longitudinal cross-section, each tooth 40 of the belt is substantially composed of two circular arcs 41 and 42 of equal radius R8 and R9 crossing at a point 42a on the center-line X—X of the tooth cross-section. The centers of curvature 43 and 44 from which the arcs 41 and 42 are drawn are located on a line 45 that extends substantially parallel to the tensile member 13 in the longitudinal direction of the belt. The extent of the arcs 41 and 42 is such that they extend to the line 45. The centers of curvature for the arcs 41 and 42 are displaced on opposite sides of the center-line X—X from their corresponding arcs by an amount that is generally equal to or less than 10% of the radius of curvature of the arcs 41 and 42. A land area 46 connects the ends of the two root regions 47 and 48 of adjacent teeth. The root regions when seen in cross-section are circular arcs having equal radii R10 and R11.

Figure 4:
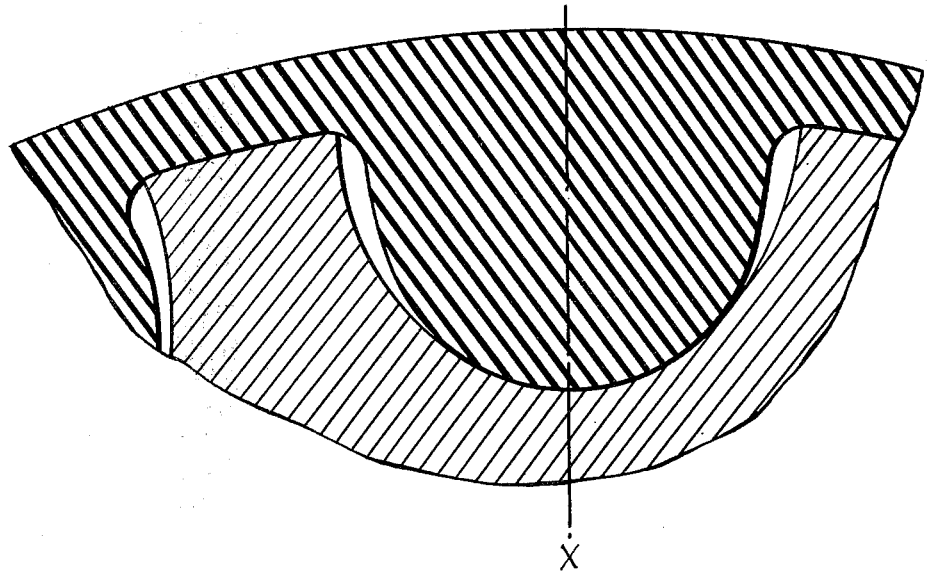
FIG. 4 is a view corresponding to FIG. 3 but with the belt wrapped round a known conjugate form of pulley.

FIG. 4 shows the same belt of FIG. 3 wrapped, under no load, around a pulley having teeth of true conjugate form to the belt teeth, such as is known in the prior art. A comparison of FIGS. 3 and 4 will illustrate how the pulley tooth and groove form of the invention differs from the conjugate tooth and groove form. In the pulley according to the invention, the spacing between the facing flanks of adjacent pulley teeth is such that the groove formed between those teeth is substantially wider than the width of the conjugate groove shown in FIG. 4. This avoids interference between the leading flank of the pulley tooth and the trailing flank of the belt tooth. The shape of the flank of each pulley tooth shown in FIG. 3 differs from the shape of the flank of the conjugate tooth shown in FIG. 4 and this different shaping again assists in avoiding interference between the belt and pulley teeth. One of the contributing factors to this different shaping is the fact that the radii R1 and R2 of the non-intersecting arcs 21 and 22 of the pulley groove according to the invention are smaller than the radii of the arcs to which the flanks of the conjugate tooth approximate. The depth of the groove between adjacent pulley teeth in the pulley of the invention is less than the depth of groove in the conjugate pulley, and is thus less than the height of a tooth of the belt. This is shown clearly in FIG. 3 where the tip of the belt tooth is shown as overlapping the base of the pulley groove. Obviously, this will not happen in practice and the belt tooth will be distorted due to this contact with the bottom of the pulley groove. It is preferred that the pulley groove depth be between 1% and 15% less than the belt tooth height. The shape of the tip of each tooth of the pulley according to the invention, as shown in FIG. 3, is modified from the conjugate form shown in FIG. 4 by making the tip radii of the pulley of the invention substantially greater than the radii of the conjugate teeth. This provides greater clearance between the tooth tip and the root of the belt in the arrangement according to the invention than is present in the conjugate form.

In designing a drive according to the invention, in addition to the criteria already described, it is desirable that the ratio of belt tooth shear area (the area represented by the length of the broken line J-K in FIG. 3) to pulley land area (the area represented by the length of the line F-G in FIG. 2) be between 50:1 and 1:1 and desirably less than 15:1. It is also desirable that the ratio of the belt tooth shear area to the belt land area (the area represented by the length of line J-L in FIG. 3) be between 4.69:1 and 1:1, and desirably less than 3.5:1. Within the above limitation, it is also desirable to use the maximum number of belt teeth per unit length.

By designing a belt and pulley drive in accordance with the criteria given herein, it is possible to obtain any or all of the following advantages: reduced noise, higher angular velocities because pulleys of smaller diameter can be used, higher load capacity, increased life of the belt, more compact power transmission systems since smaller pulleys enable the pulleys in the system to be spaced closer together, and power transmission systems of lower weight because the pulleys are smaller and weigh less.

The pulley described herein may be used in combination with toothed belts other than that disclosed in the patents to Case, Miller and Hoback. The longitudinal cross-sectional contour of the individual belt teeth may be trapezoidal, curvilinear or wedge-shaped or a combination or a modification of these contours. The belt may also have teeth on both sides of the tensile member.

While there has been described what is at present considered to be preferred embodiments of this invention, it will be obvious to those skilled in the art that various changes and modifications may be made therein without departing from the spirit of the invention, and it is, therefore, aimed to cover all such changes and modifications as fall within the scope and spirit of this invention.

What is claimed is:

1. A power transmission system comprising at least one pulley with teeth in combination with a flexible belt with teeth, the pulley teeth being a non-conjugate form of the belt teeth, the pulley teeth being separated by pulley cavity portions and the belt teeth being separated by belt cavity portions, each pulley tooth in longitudinal cross-section being symmetrical about a pulley tooth centerline intersecting with a center of said pulley, said pulley tooth including a tip portion and opposite flank portions extending from said tip portion, the tip portion being defined by first and second circular arcs on opposite sides of said pulley tooth centerline, the centers of curvature of said first and second arcs being displaced from each other on a circular arc having a common center with said pulley, a peripheral pulley segment at the outermost portion of said pulley tooth tip joining the first and second arcs, each said pulley cavity being symmetrical about a pulley cavity centerline intersecting with the center of said pulley, said pulley cavity being defined by a third and fourth circular arcs on opposite sides of said pulley cavity centerline extending into the flank portions of consecutive pulley teeth, the centers of curvature of said third and fourth arcs being displaced from each other on a circular arc having a common center with said pulley, a base pulley segment joining the third and fourth circular arcs to define a base portion of said pulley cavity, a first pulley flank segment connecting one of the third and fourth circular arcs and one of the first and second circular arcs, and a second pulley flank segment connecting the other of the third and fourth circular arcs and the other of the first and second circular arcs, each belt tooth in longitudinal cross-section being symmetrical about a belt tooth centerline, said belt tooth being partially defined by fifth and sixth circular arcs intersecting at said belt tooth centerline and extending into opposite flank portions of said belt tooth, the centers of curvature of said fifth and sixth arcs being displaced from each other and equidistant from a line tangent to consecutive belt tooth cavities, said belt cavity being symmetrical about a belt cavity centerline and being partially defined by the fifth arc of one belt tooth and the sixth arc of a consecutive belt tooth, said belt cavity having a base portion defined by seventh and eighth arcs on opposite sides of said belt cavity centerline, the centers of curvature of said seventh and eighth arcs being displaced from each other and equidistant from said line tangent to consecutive belt tooth cavities, a belt segment at the innermost portion of said belt cavity joining the seventh and eighth arcs, portions of said seventh and eighth arcs extending toward the flank portions of consecutive belt teeth, the distance between the centers of curvature of said seventh and eighth arcs being selected to exceed the distance between the centers of curvature of said first and second arcs such that in no-load condition of the belt and pulley the width of the base portion of said belt cavity exceeds the width of said pulley tooth tip, and the center of curvature locations and the radii of said third, fourth, fifth and sixth circular arcs being selected such that in said no-load condition the height of said belt tooth along said belt tooth centerline measuring from the intersection of said fifth and sixth arcs to the intersection of said belt tooth centerline with the line tangent to consecutive belt tooth cavities exceeds the depth of said pulley cavity along said pulley cavity centerline measuring from the intersection of said base pulley segment with said pulley cavity centerline to the intersection of said pulley cavity centerline with an arc having a common center with said pulley and tangent to consecutive pulley teeth tips.

* * * * *